Figure 1:
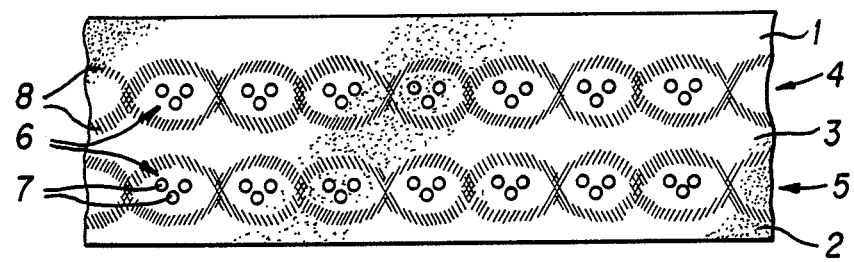

United States Patent [19]

Stijntjes et al.

[11] Patent Number: 4,839,220
[45] Date of Patent: Jun. 13, 1989

[54] CONVEYOR BELT, IN PARTICULAR FOR A THROUGH CONVEYOR

[75] Inventors: Johan Stijntjes, Alkmaar; Simon J. Roet, Barsingerhorn, both of Netherlands

[73] Assignee: Ammeraal Conveyor Belting B. V., Heerhugowaard, Netherlands

[21] Appl. No.: 209,137

[22] Filed: Jun. 20, 1988

[30] Foreign Application Priority Data

Jun. 22, 1987 [DE] Fed. Rep. of Germany ....... 8708636

[51] Int. Cl.⁴ ............................................. B32B 7/00
[52] U.S. Cl. ................................... 428/258; 428/224; 428/257; 428/246; 428/260
[58] Field of Search .............. 428/257, 258, 224, 229, 428/246, 260

[56] References Cited

U.S. PATENT DOCUMENTS

| 4,015,038 | 3/1977 | Romanski et al. | 428/257 |
|---|---|---|---|
| 4,202,382 | 5/1980 | Westhead | 428/257 |
| 4,296,855 | 9/1981 | Blalock | 428/257 |
| 4,351,874 | 9/1982 | Hirly | 428/257 |
| 4,414,264 | 11/1983 | Olson | 428/258 |
| 4,433,493 | 2/1984 | Poisson | 428/258 |
| 4,489,125 | 12/1984 | Gagnon | 428/258 |
| 4,518,647 | 5/1985 | Morrison | 428/258 |
| 4,533,594 | 8/1985 | Buchanan | 428/258 |
| 4,563,385 | 1/1986 | Bhatt et al. | 428/258 |

Primary Examiner—James J. Bell
Attorney, Agent, or Firm—Armstrong, Nikaido, Marmelstein, Kubovcik & Murray

[57] ABSTRACT

Conveyor belt, in particular for a trough conveyor, from synthetic material e.g. polyvinyl chloride, polyolefin, polyurethane, polyester, polyether blockamide and such like, with at least one fabric embedded in it consisting of wrap and weft, the thread material of the weft (6) consisting of two or more, up to ten, monofilament threads (7). The thread material may have a twine of 40 to 80 twists/meter and a titre of 100 to 1000 dtex.

11 Claims, 1 Drawing Sheet

CONVEYOR BELT, IN PARTICULAR FOR A THROUGH CONVEYOR

The invention relates to a conveyor belt, in particular for a trough conveyor, from synthetic material with at least one fabric embedded in it, consisting of warp and weft, the thread material of the weft comprising monofilament threads.

Conveyor belts with fabrics embedded in it are known for various applications. Said synthetic material can consist e.g. of polyvinyl chloride, polyolefin, polyurethane, polyester, polyether blockamide and such like. Conveyor belts for trough conveyors have not only to fit themselves to the trough shape but should have also a given stiffness in transverse direction. In view of this conveyor belts for trough conveyors were provided with fabrics embedded in it, in which the weft extending transverse to the direction of movement of the conveyor belt is a monofilament thread. It has appeared, however, that such conveyor belts are less suitable for trough conveyors because the monofilament threads will break after some time.

Besides this there are also conveyor belts for trough conveyors from which the fabrics embedded in it are comprising thread material from multifilament threads for the warp as well as for the weft. These conveyor belts, however, do not always have a sufficient transverse stiffness and so give problems concerning the control and running properties.

The object of the invention is to offer a conveyor belt in particular for trough conveyors which is having sufficient adaptability for trough conveyors also when having adequate stiffness and which is break-safe.

Said object is achieved by the fact that the thread material of the weft consists of two or more twisted monofilament threads. The said material of the weft may consists from up to ten monofilament threads. These monofilament threads may be composed e.g. from polyester, polyamide or such like materials.

By this a sufficient transverse stiffness of the conveyor belt is obtained without unfavourably effecting the adaptability to a trough shape. The conveyor belts are also break-proof. The properties of the conveyor belt in particular depend on the twisting number in the twist, the number and the titre of the monifilament threads as well as on the number of the fabrics embedded in it. It has appeared to be favourable when the thread material of the weft comprises a twine of 40 to 80 twist/meter. In this case the monofilament threads may have a titre of 100 to 1000 dtex.

Advantageously the thread material of the warp may consist of multifilament or more twisted threads. In this case it may concern multifilament threads from polyester or polyamide which eventually are combined with other materials such as cotton, aramide and such like. For the thread material of the warp favourable twines are lying between 20 and 200 twists/meter. The threads of the warp may have a titre of 280 to 4400 dtex.

Obviously the characteristics of the conveyor belt may also be effected by two or more fabrics being embedded which are separated from each other by an intermediate layer. The fabrics embedded in it may be executed in a linen, twill, diamond pattern design and such like.

Figure 2:
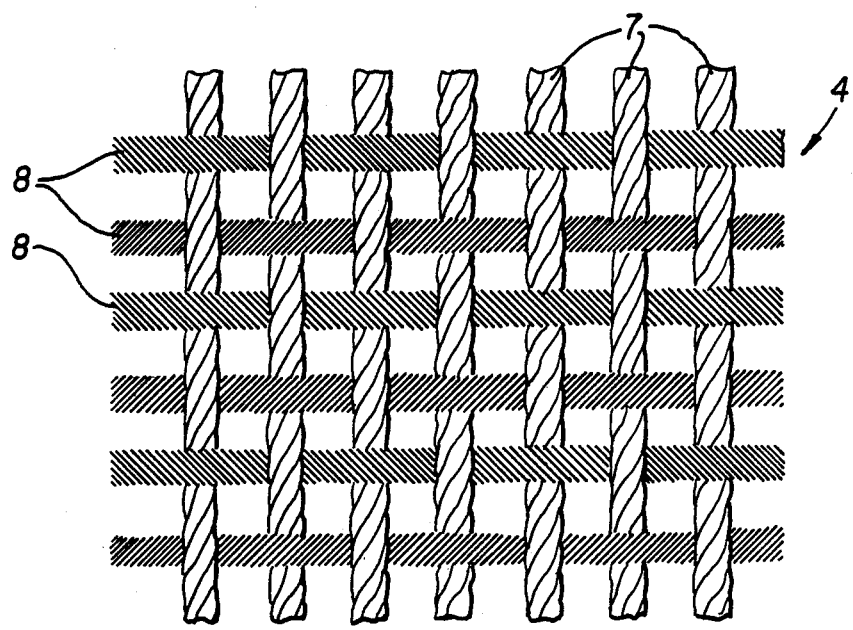

In the following an embodiment of the invention shown in the drawing is explained; it is showing:

FIG. 1 a longitudinal section over a conveyor belt;
FIG. 2 a plan view of a fabric embedded in the conveyor belt.

The conveyor belt shown in the drawing is appropriate for applying in case of trough conveyors. The conveyor belt consists of an upper covering layer 1, a lower covering layer 2 and an intermediate layer 3 separating the two fabrics 4, 5 being embedded in the conveyor belt. The covering layers 1, 2 and the intermediate layer 3 consists of synthetic material. In that case it may concern polyvinyl chloride, polyolefin, polyurethane, polyester, polyether blockamide and such like.

The embedded fabrics 4, 5 may be executed in linen, twill, diamond pattern design or such like. They comprise warp and weft. The fabric specification can be for the warp $25 \times 1100$ dtex/cm or equivalent at the maximum and for the weft $20 \times 800$ dtex/cm or equivalent at the maximum.

As in particular can be derived from FIG. 1, the thread material of each weft 6 comprises three twisted monofilament threads 7. The twine of each weft 6 may amount between 40 and 80 twists/meter. The monofilament threads 7 may have a titre of 100 to 1000 dtex. The threads 7 of the weft 6 may consist of polyester, polyamide or other materials. The weft 6 extends itself transverse to the direction of movement of the conveyor belt.

The thread material of the warp also consists of twisted thread. In this case it may concern multifilament threads of polyester or polyamide which eventually are combined with threads of other materials, as cotton, aramide and such like. The thread material of the warp may have a twine of 20 to 200 twists/meter as well as a titre of 280 to 4400 dtex.

We claim:
1. Conveyor belt, in particular for a trough conveyor, from synthetic material with at least one fabric embedded in it consisting of warp and weft, the thread material of the weft comprising monofilament threads, characterized in that the thread material of the weft (6) consists of two or more twisted monofilament threads (7).

2. Conveyor belt according to claim 1, characterized in that the thread material of the weft (6) consists of up to ten monofilament threads (7).

3. Conveyor belt according to claim 1 or 2, characterized in that the thread material of the weft (6) consists of three monofilament threads (7).

4. Conveyor belt according to claim 1, characterized in that the thread material of the weft (6) is having a twine of 40 to 80 twists/meter.

5. Conveyor belt according to claim 1, characterized in that the monofilament threads (7) are having a titre of 100 to 1000 dtex.

6. Conveyor belt according to claim 1, characterized in that the thread material of the warp (8) consists of multifilament threads.

7. Conveyor belt according to claim 6, characterized in that the thread material of the warp (8) is having a twine of 20 to 200 twists/meter.

8. Conveyor belt according to one of the claims 6 or 7, characterized in that the threads of the warp are having a titre of 280 to 4400 dtex.

9. Conveyor belt according to claim 1, characterized in that two or more fabrics (4,5) are embedded in it which are separated from each other by means of an intermediate layer (3).

10. Conveyor belt according to claim 9, characterized by a fabric specification for the warp of maximum $25 \times 1100$ dtex/cm.

11. Conveyor belt according to one of the claims 9 or 10, characterized by a fabric specification for the weft of maximum $20 \times 800$ dtex/cm.

* * * * *